Dec. 13, 1955 W. A. FICKETT ET AL 2,727,101
MONITOR FOR FREQUENCY SHIFT COMMUNICATION SYSTEM
Filed Dec. 23, 1954
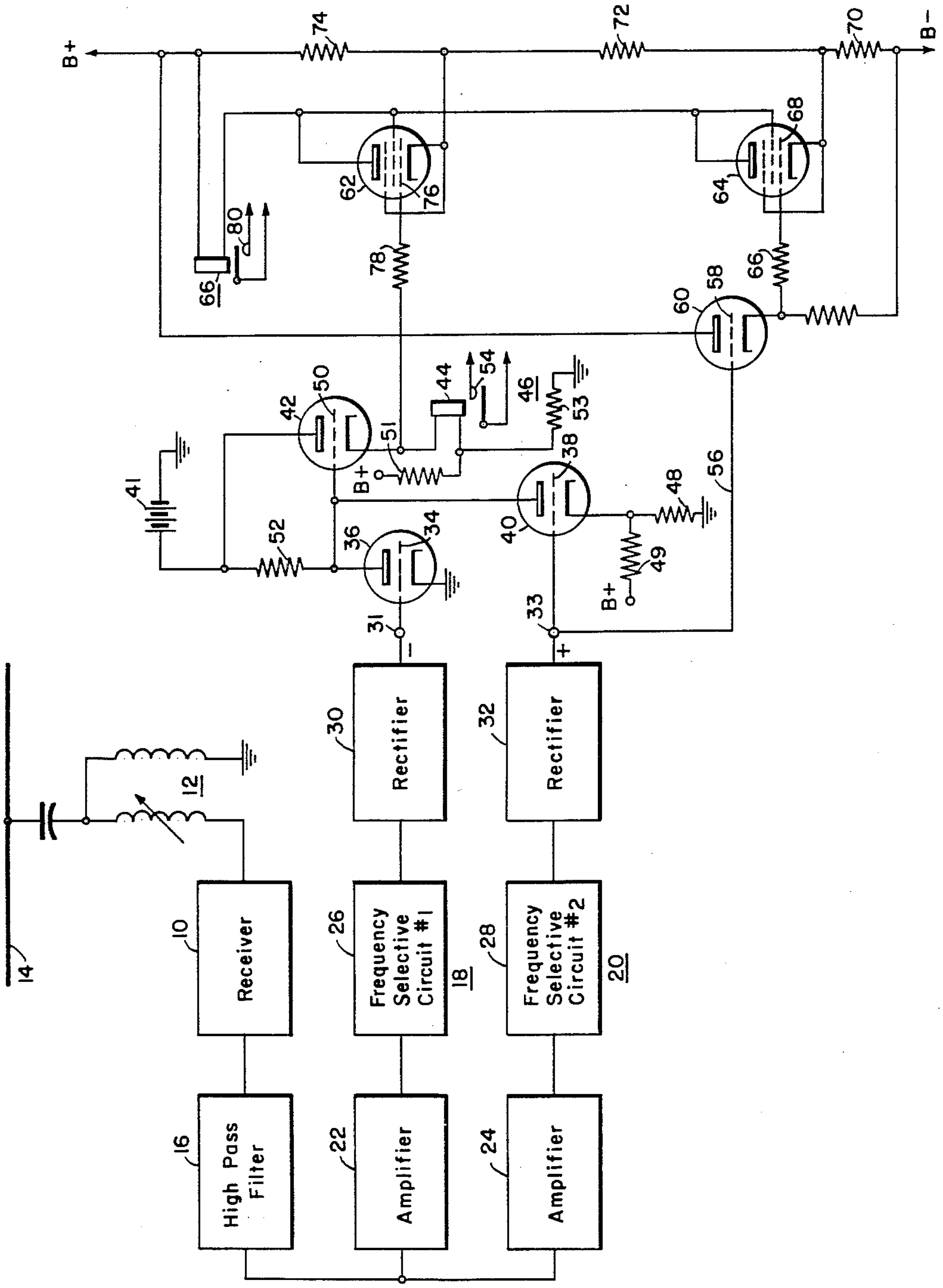
WITNESSES
Edwin C. Baesler
T. H. Murray
INVENTORS
Walter A. Fickett
& Cecil E. Land
BY F. E. Browder
ATTORNEY ted States Patent Office
2,727,101
Patented Dec. 13, 1955

2,727,101

MONITOR FOR FREQUENCY SHIFT COMMUNICATION SYSTEM

Walter A. Fickett, Severn, and Cecil E. Land, Baltimore, Md., assignors to Westinghouse Electric Corporation, East Pittsburgh, Pa., a corporation of Pennsylvania Application December 23, 1954, Serial No. 477,328

6 Claims. (Cl. 179—175.3)

This invention relates to devices for indicating equipment failures in signaling systems and more particularly to indicating devices of the type described which can be effectively used in frequency shift signaling systems.

In many telephone communication systems, provision must be made for a preliminary off-on ringing or indicating voltage to establish communication between two stations in the system. Although an off-on signal of one frequency can be used for this purpose, it has generally been found desirable to use a continuous signal which shifts between two frequencies since the possibility of false operation from interference signals can be more effectively eliminated by using the latter method. The continuous signal system usually includes a relay which becomes energized or deenergized when the signal is shifted from one frequency to the other. Relays are located at the various terminal stations in the system, and the contacts of each relay are available for external circuitry to actuate a buzzer or other device which indicates a call from another station in the system.

It is an object of this invention to provide a device for indicating equipment failures or off-normal conditions in a frequency shift communication system of the type described above.

Another object of the invention lies in the provision of a failure indicating device which will be actuated when any portion of a frequency shift system at a signal receiving station fails, including the indicating means itself.

A further object of the invention lies in the provision of means in a frequency shift system for actuating a relay when a continuous signal shifts from one frequency to another.

A still further object of the invention lies in the provision of means for keeping the aforesaid relay deenergized during stand-by conditions when there is an absence of a received signal at the receiving station.

The above and other objects and features of the invention will become apparent from the following description taken in connection with the accompanying single figure drawing which illustrates the invention schematically.

Referring to the drawing, it can be seen that in the present embodiment of the invention a receiver 10 is connected through a conventional line tuner 12 to the main conductor or channel 14 of a power line carrier system. The receiver 10 is of the conventional type well known in the art; and, hence, is shown in block form only. Although the receiver is shown in association with power line carrier apparatus, it should be readily apparent that it can be used equally well in a radio system.

The output of receiver 10 is first fed through an RC high pass filter 16 which offers high attenuation to audio signals and thus prevents them from passing to the remainder of the system. After passing through filter 16, the frequency shift signals are divided into two channels 18 and 20 where they are first amplified by amplifiers 22 and 24. Each of the channels 18 and 20 includes a frequency selective circuit 26 or 28 and a rectifier 30 or 32. The signal which passes through filter 16 will be continuous and will shift in frequency between two predetermined frequencies $F_1$ and $F_2$. When a signal having the predetermined frequency $F_1$ is received by the system, it will pass through filter 16 to amplifiers 22 and 24. Circuit 28 is tuned to frequency $F_1$; and, therefore, the signal will pass through circuit 28 to rectifier 32 which produces a positive direct-current output voltage at terminal 33. Since circuit 26 is tuned to frequency $F_2$, it will offer high attenuation to the signal which passes through circuit 28 and will prevent its passage to rectifier 30. On the other hand, if the frequency of the received signal should shift to frequency $F_2$, circuit 28 will offer high impedance to the signal; whereas circuit 26, being tuned to frequency $F_2$, will pass the signal to rectifier 30 which produces a negative direct-current output voltage at terminal 31.

The negative voltage produced by rectifier 30 is applied to the grid 34 of a first amplifier tube 36. Likewise, the positive voltage from rectifier 32 is applied to the grid 38 of a second amplifier tube 40. Tubes 36 and 40 are connected in parallel between the positive and negative terminals of a source of anode voltage 41. A third triode tube 42 is also connected between the aforesaid positive and negative terminals. Included in the cathode circuit of tube 42 is energizing coil 44 of a relay 46.

When there is an absence of a received signal for the system, neither of the rectifiers 30 nor 32 will produce an output voltage. Two voltage dividing resistors 48 and 49 will apply a positive voltage to the cathode of tube 40 under this condition; and, therefore, tube 40 will not conduct. Tube 36, however, has its cathode connected directly to ground and, hence, will conduct, causing a considerable voltage drop to appear across resistor 52. Resistors 51 and 53 normally apply a positive potential to the cathode of tube 42, and the voltage drop across resistor 52 lowers the direct-current potential on grid 50 to the point where tube 42 is cut off and relay 46 is deenergized.

Under stand-by conditions, when a signal frequency $F_1$ is received by the system, rectifier 32 will apply a positive bias to the grid 38 of tube 40. This positive bias will overcome the fixed negative bias produced by resistors 48 and 49, and, therefore, tube 40 will conduct. The additional current which now flows through resistor 52 to the positive terminal of the anode voltage source drops the grid 50 of tube 42 to an even lower direct-current potential and effectively clamps the grid at this potential. No interference of any type can cause relay 46 to energize.

If the frequency of the received signal should shift to $F_2$, the positive bias on grid 38 will be removed, and the grid will return to its negative bias potential. At the same time, amplifier 30 will apply a negative voltage to the grid 34 of tube 36, driving it to cutoff. Under these conditions, neither tube 36 nor tube 40 will conduct; current will not flow through resistor 52; and, therefore, the grid 50 of tube 42 will jump to a positive potential approaching that of the supply voltage. The cathode of tube 42 "follows" the grid to a high potential so that tube 42 conducts and relay 46 becomes energized. The normally open contacts 54 of relay 46 will, therefore, close and will complete a circuit, not shown, which actuates a buzzer or other signaling device.

The output of the rectifier 32 is also connected through a path 56 to the grid 58 of triode 60 which is connected between the positive and negative terminals of an anode voltage source, not shown. This voltage source may be the same as that for tubes 36, 40 and 42 or may be separate, depending upon requirements. A pair of parallel-connected pentode vacuum tubes 62 and 64 are also connected to the positive and negative terminals of the aforesaid anode voltage source. Each of tubes 62 and 64 is included in the energizing circuit of an alarm relay 66. Under stand-by conditions when a continuous signal of frequency $F_1$ is received, rectifier 32 will supply its positive output voltage appearing at terminal 33. This positive voltage will be applied through path 56 to the grid 58 of tube 60. By inherent cathode follower characteristics, the cathode of tube 60 will be at a slightly greater positive potential than grid 58. This cathode is directly coupled through resistor 66 to the grid 68 of the pentode 64. The cathode of tube 64 has a fixed bias applied thereto by means of resistors 70, 72 and 74 to a point slightly less positive than the cathode of tube 60, thereby causing tube 64 to conduct. The resulting plate current through tube 64 and relay 66 causes the relay to energize. Control grid 76 of tube 62 is directly coupled through resistor 78 to the cathode of triode 42 which, under stand-by conditions, is at the potential effected by resistors 51 and 53 since tube 42 is cut off during this time. The cathode of tube 62 is biased positive by means of resistors 70, 72 and 74 to a point just beyond cutoff of its plate current. However, as long as stand-by conditions prevail (that is, as long as frequency $F_1$ is received by the system), relay 66 will remain energized because current flows through one of the parallel tubes 64.

If, for any reason, the continuous tone of frequency $F_1$ should fail, the positive bias applied to grid 58 of tube 60 will disappear, and consequently, tube 60 will be cut off. The cathode of tube 60 will, therefore, be driven negative; and the resulting negative bias applied to grid 68 will cause tube 64 to cut off. Relay 66 now becomes deenergized, and contacts 80 close. These contacts may be included in external circuitry, not shown, which supplies voltage to an alarm device, such as a signal buzzer or indicating light. It should be noted that relay 66 will also become deenergized under stand-by conditions if tube 60 or tube 64 should fail.

If the frequency of the received signal is shifted from $F_1$ to $F_2$, the positive bias will disappear from grid 58 of tube 60, thereby causing cutoff of tube 64. However, at the same time, tube 42 will conduct; and, thus, the voltage of its cathode will become increasingly positive. This positive voltage will be applied through resistor 78 to grid 76 of tube 62 to cause tube 62 to conduct and keep relay 66 energized. Failure of tube 42 or tube 62 will render tube 62 ineffective for purposes of energizing relay 66. Tube 64, however, will still conduct under these conditions, but its conduction will be periodic in accordance with the shift in frequency between $F_1$ and $F_2$. Hence, contacts 80 will be closed and opened periodically, and will indicate the failure of tube 42 or tube 62. Likewise, if tube 60 or tube 64 should fail, pentode 62 can still conduct when the frequency of the received signal shifts, but conduction will be periodic in accordance with the frequency shift to indicate the tube failure.

It is apparent that the vacuum tubes used in the present invention are used primarily as switches. In this respect, any suitable switching means may be used in place of the tubes. For example, transistors could be used as a substitute for the vacuum tubes without materially affecting the operation of the circuit.

It can be seen, therefore, that the present invention provides alarm apparatus for indicating the complete absence of a received signal in a frequency shift system and also for indicating failure of any of the components of the alarm apparatus.

Although the invention has been described in connection with a single specific embodiment, it will be understood by those skilled in the art that various changes in form and arrangement in parts may be made to suit requirements without departing from the spirit and scope of the invention.

We claim as our invention:

1. In combination with a signaling system which produces a positive direct current control voltage in response to signals having one predetermined frequency and a negative direct current control voltage in response to signals having another predetermined frequency, first and second electron discharge tubes, an anode and a control electrode included in each of said tubes, means for applying said positive and negative control voltages to the control electrodes of said first and second tubes respectively, a third electron discharge tube having a control electrode included therein, a connection between the anodes of said first and second tubes and the control electrode of said third tube, a relay responsive to current flow through said third discharge tube for indicating the existence of said negative control voltage, and means for sensing equipment failures in said system, said latter-mentioned means comprising a fourth electron discharge tube, a control electrode for said fourth tube normally connected to said positive direct current control voltage, an alarm relay, a pair of electron discharge devices connected in parallel for controlling actuation of said relay, a control electrode for each of said devices, a connection between the control electrode of one of said devices and the cathode of said fourth tube, and a connection between the control electrode of the other of said devices and the cathode of said third tube.

2. The combination claimed in claim 1 wherein a bias is applied to said first tube to prevent it from conducting in the absence of a positive control voltage.

3. In combination with a signaling system which produces a positive direct current control voltage in response to signals having one predetermined frequency and a negative direct current control voltage in response to signals having another predetermined frequency, a source of electrical energy, first and second electron valves connected in parallel between the positive and negative terminals of said energy source, the first of said valves being controllable in response to said positive control voltage and the second of said valves being controllable in response to said negative control voltage, a third electron valve connected between the positive and negative terminals of said energy source, said third valve being controlled in accordance with the current flow through said first and second valves, a relay actuable in response to current flow through said third valve, and means for sensing equipment failures in said system, said means comprising an alarm relay, fourth and fifth electron valves connected in parallel for controlling actuation of said alarm relay, said fourth valve being controlled in accordance with the current flow through said third valve, and said fifth valve being controlled by said positive control voltage.

4. In combination with a signaling system which produces a positive direct current control voltage in response to signals having one predetermined frequency and a negative direct current control voltage in response to signals having another predetermined frequency, first and second electron discharge tubes, an anode and a control electrode for each of said tubes, means for applying said positive control voltage to the control electrode of the first of said tubes, means for applying a bias to said first tube to prevent conduction therethrough in the absence of said positive control voltage, means for applying said negative control voltage to the control electrode of said second tube, a third electron discharge tube having a control electrode included therein, a connection between the control electrode of said third tube and the anodes of said first and second tubes, a relay actuable in response to current flow through said third tube, and apparatus including a normally energized alarm relay for indicating equipment failures in said system, said apparatus being responsive to said positive and negative control voltages in a manner such that the alarm relay will remain energized in response to either or both of said control voltages and will become deenergized in the absence of both of said control voltages.

5. In combination with a signaling system which produces a positive direct current control voltage in response to signals having one predetermined frequency and a negative direct current control voltage in response to signals having another predetermined frequency, a normally deenergized relay, a source of voltage for said relay, switching means connected to said voltage source for controlling operation of said relay, apparatus including said switching means for causing actuation of said relay whenever the signaling system produces a negative control voltage, and apparatus for indicating equipment failures in said system, said indicating apparatus including an alarm relay, a pair of parallel-connected switching devices for controlling actuation of said alarm relay, one of said switching devices being opened in the absence of energizing current flow through said first-mentioned relay, and the other of said switching devices being opened in the absence of said positive control voltage.

6. In combination with apparatus which produces a positive control voltage under one set of predetermined conditions and a negative control voltage under another set of predetermined conditions, a relay, a first electron valve for controlling actuation of said relay, apparatus responsive to said positive and negative control voltages for controlling operation of said first electron valve, a second relay, apparatus including second and third parallel-connected electron valves for controlling actuation of said second relay, means for blocking current flow through said second electron valve in the absence of current flow through said first electron valve, and means for blocking current flow through said third electron valve in the absence of said positive control voltage.

No references cited.